J. A. MURPHY & R. J. HARRISON.
PROTECTIVE SHOE FOR TIRES.
APPLICATION FILED JUNE 7, 1910.
1,049,313.
Patented Dec. 31, 1912.
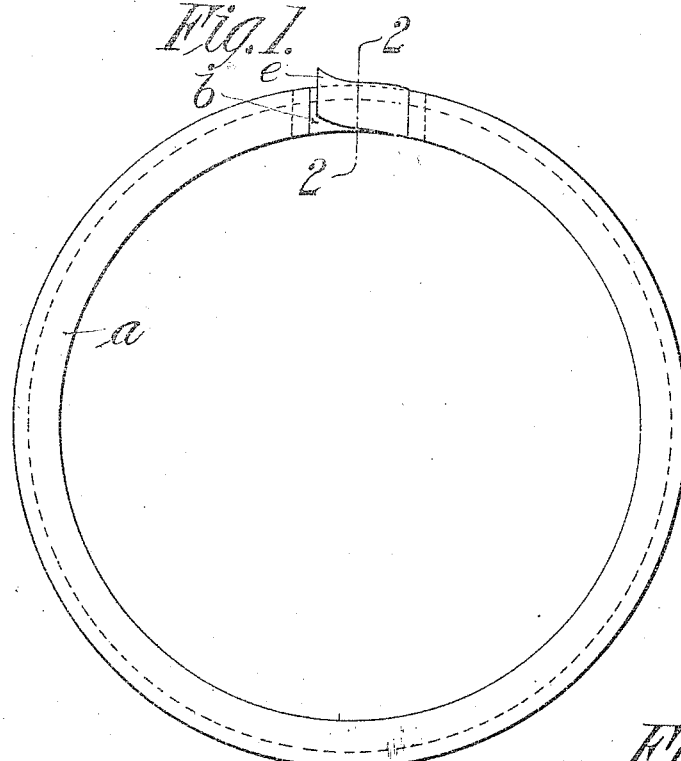
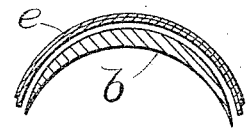
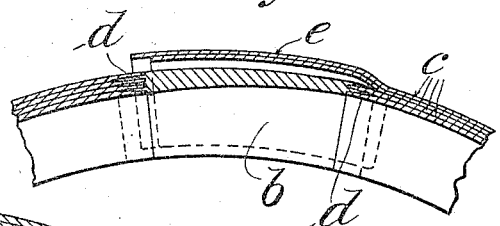
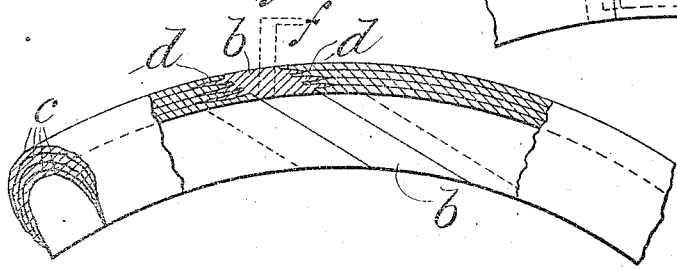
WITNESSES:
H. L. Sprague
Harry W. Bowen
INVENTORS
James A. Murphy
Robert J. Harrison
BY Chapin Neo
ATTORNEY.

UNITED STATES PATENT OFFICE.

JAMES A. MURPHY, OF HOLYOKE, AND ROBERT J. HARRISON, OF CHICOPEE FALLS, MASSACHUSETTS, ASSIGNORS OF ONE-THIRD TO CHARLES H. MORGAN, OF HOLYOKE, MASSACHUSETTS.

PROTECTIVE SHOE FOR TIRES.

1,049,313.

Specification of Letters Patent.

Patented Dec. 31, 1912.

Application filed June 7, 1910. Serial No. 565,584.

*To all whom it may concern:*

Be it known that we, JAMES A. MURPHY and ROBERT J. HARRISON, citizens of the United States of America, residing at Holyoke and Chicopee Falls, respectively, in the county of Hampden and State of Massachusetts, have invented new and useful Improvements in Protective Shoes for Tires, of which the following is a specification.

This invention relates to pneumatic tires and especially to the construction of a protective shoe for the inner tube of such tires to be interposed between said tube and the inner surface of the tire casing for the purpose of protecting the inner tube against puncture from any sharp object which might penetrate the tread of the casing.

Protective shoes for the inner tubes of pneumatic tires have been made heretofore,—one type consisting of an endless ring molded to conform to the interior surface of the casing and the exterior surface of the inner tube, this shoe being of such diameter relative to the internal diameter of the casing as to necessitate forcing it into the casing prior to the introduction of the inner tube, the idea being to make the fit between the shoe and the casing so close that after the inner tube has been inflated and the tire put into use, this shoe will not creep and thus set up a frictional action against the outer surface of the tube and the inner surface of the casing. This structure is both practical and efficient but it has been found in practice that the internal diameter of casings of a given size of tire will vary so greatly that the shoe which would fit tightly in one would be so loose in another casing as to render it liable to creep when in use. This has made it necessary to construct these endless protective shoes in a great number of sizes which is a commercial handicap. Another type of protective shoe, designed to overcome this objection, has been made in the form of a broken ring having overlapping beveled ends, this shoe being dependent upon the pressure of the inner tube, when inflated, to hold it with sufficient force against the inner circumference of the casing to prevent its creeping; but when the tire is in use, there is more or less movement, one relative to the other, of the overlapping ends of this shoe thereby setting up frictional action between the shoe and the casing on the one side and the inner tube on the other.

The object of the present invention is to provide a protective shoe of the character described in the form of an endless ring made up like the tread portion of a casing of several layers of fabric and rubber vulcanized on a core to render the structure practically of a homogeneous character, the two ends of the protective shoe being united together to make an endless ring by means of a piece of relatively soft rubber of such a compound as will, after vulcanization, render it tough and elastic, this uniting section of rubber being protected as far as possible against puncture. By means of a protective shoe constructed in this manner, it may be made as a continuous ring thereby avoiding any friction between the overlapping ends, which is liable to occur when the shoe is made as a broken ring, and yet having the extensible characteristic whereby the expansive action of the inflated inner tube will, owing to the yielding nature of the uniting rubber section, distend the protective shoe forcing it into such intimate contact with the inner surface of the casing as to prevent its creeping.

The invention is clearly illustrated in the accompanying drawing, in which,—

Figure 1 is a side elevation of the shoe showing the uniting extensible section and one manner of protecting it, by carrying one or more layers of fabric of which the shoe is made loosely over the section. Fig. 2 is a cross sectional view taken through the elastic uniting section of the shoe, substantially on line 2—2, Fig. 1. This view also shows, in section, the overlapping flap of fabric. Fig. 3 is a sectional elevation taken at right angles to Fig. 2 (that is in the plane of the shoe) and shows the method of inserting the elastic section to unite the two ends of the shoe; it also shows how one or more layers of the fabric are carried over outside of the elastic section to protect the same, as far as possible, against puncture. Fig. 4 is a sectional view like Fig. 3, but showing the elastic section located diagonally of the shoe, instead of radially, as in the preceding figures.

Referring now to the drawings, *a*, Fig. 1, indicates the protective shoe as a whole; *b* is the elastic section constituting an integral part of the shoe and serving to unite the two ends thereof. The layers of fabric of which the shoe is made up are indicated by c, which, as usual in this particular type of shoe, are of fabric having a layer of raw rubber rolled into the surface thereof, constituting what is termed "friction cloth," which being cut to the proper shape, will be formed into a shoe of the desired thickness by superposing one layer over another, thus building the shoe up on a core. The opposite ends of these pieces of fabric do not quite meet when laid up on the core, and to unite them the various layers of fabric at the ends are left separated for a short distance and the rubber section b is formed by introducing between the separated ends of the fabric, as at d Figs. 3 and 4, sheets of raw rubber of such thickness that when pressed together and vulcanized, they will constitute a uniting medium for the two ends of the shoe. These sheets of rubber, as is well known, become, under the effect of vulcanization, a homogeneous mass and the extremities of the rubber sheets introduced between the layers of fabric will become adherent to the fabric upon vulcanization. In this way, the two ends of the shoe (which in itself is inextensible,) will be united by a section which is readily extensible but which forms part of the shoe itself. For the purpose of protecting this more or less vulnerable part of the shoe occupied by the extensible section b one or more layers of the fabric are cut long enough so that they may extend over this extensible section, as shown at e in Figs. 1, 2, and 3. Another way of protecting this vulnerable part of the shoe against puncture consists in the location of the extensible section b diagonally in the body of the shoe, as shown in Fig. 4, it being apparent that when this section is located thus, the area of unprotected surface of this section would be comprised within the two dotted lines f on said figure. When the shoe is made as shown in Fig. 4, the vulnerable area of the section b is so reduced as to render it unnecessary to protect it in the manner shown in Fig. 3 by carrying one or more thicknesses of the fabric e over said area.

The nature of the structure is such that if the shoe were found to be even a trifle greater in diameter than the internal diameter of the casing, the extensible section b thereof will be found to be also sufficiently compressible to permit the shoe to be forced into the casing in proper position, the structure thus being adapted to fit casings which might be either a trifle above, or below, their indicated diameters.

What we claim is:—

1. A protective shoe consisting of a ring of inextensible material to fit the exterior periphery of the inner tube of a pneumatic tire, said ring having a section of extensible material whereby the ring as a whole may stretch circumferentially, said extensible section serving to unite two ends of the ring, said section being located in the body of the ring diagonally to the radius of the latter, whereby the extremities of the ring may extend over and under said extensible section.

2. A protective shoe consisting of a ring comprising layers of inextensible fabric and rubber molded to fit the exterior periphery of the inner tube of a pneumatic tire, a portion of the body of the ring consisting of elastic rubber whereby the ring as a whole may yield radially, the ends of said extensible section being overlaid by the ends of the fabric and made permanently adherent thereto.

3. A protective shoe consisting of a concavo-convex ring of inextensible material to fit the exterior periphery of the inner tube of a pneumatic tire, said ring having a section of rubber inserted therein whereby the ring may yield radially, said rubber section constituting a part of the body of the shoe the ends of the latter being split to receive the end of said extensible rubber section, the latter being made permanently adherent to the ends of the shoe.

JAMES A. MURPHY.
ROBERT J. HARRISON.

Witnesses:
JAMES J. O'CONNOR,
PATRICK H. SHEEHAN, Jr.